June 29, 1943.  B. A. WITTKUHNS ET AL  2,323,267
STRAIN GAUGE FOR ROLLING MILLS AND THE LIKE
Filed Sept. 9, 1939   6 Sheets-Sheet 1
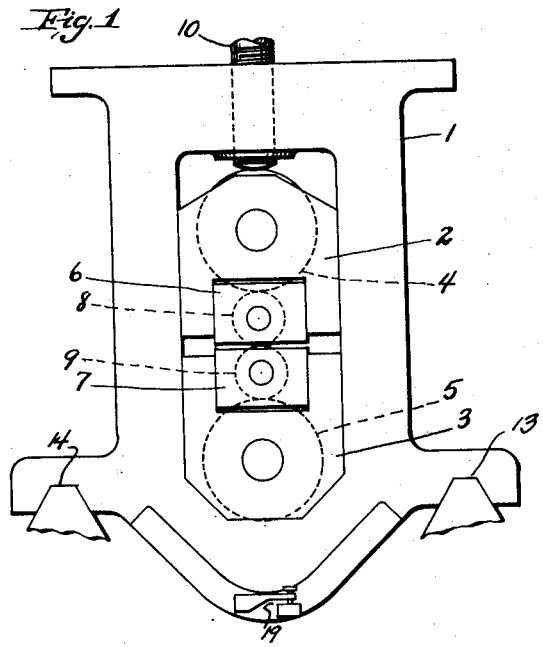
Fig. 1
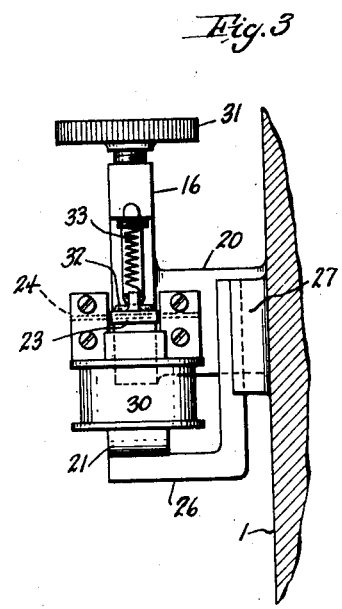
Fig. 3
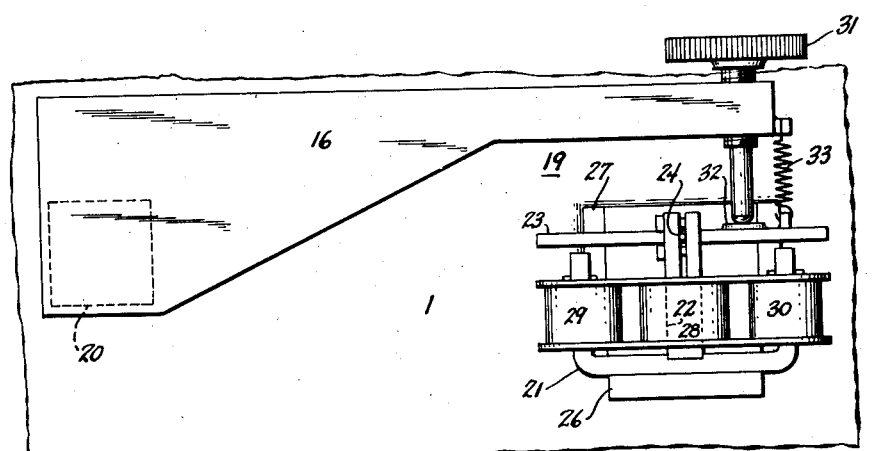
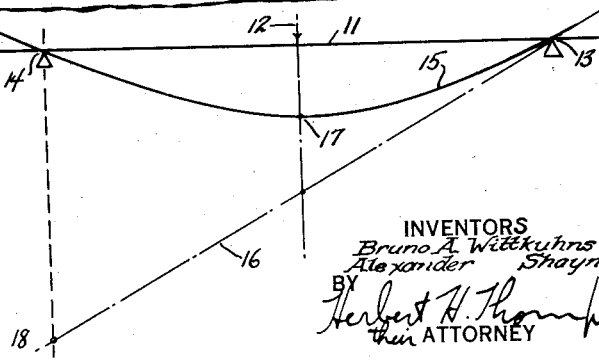
Fig. 4
Fig. 2
INVENTORS
Bruno A. Wittkuhns and
Alexander Shayne,
BY Herbert H. Thompson
their ATTORNEY

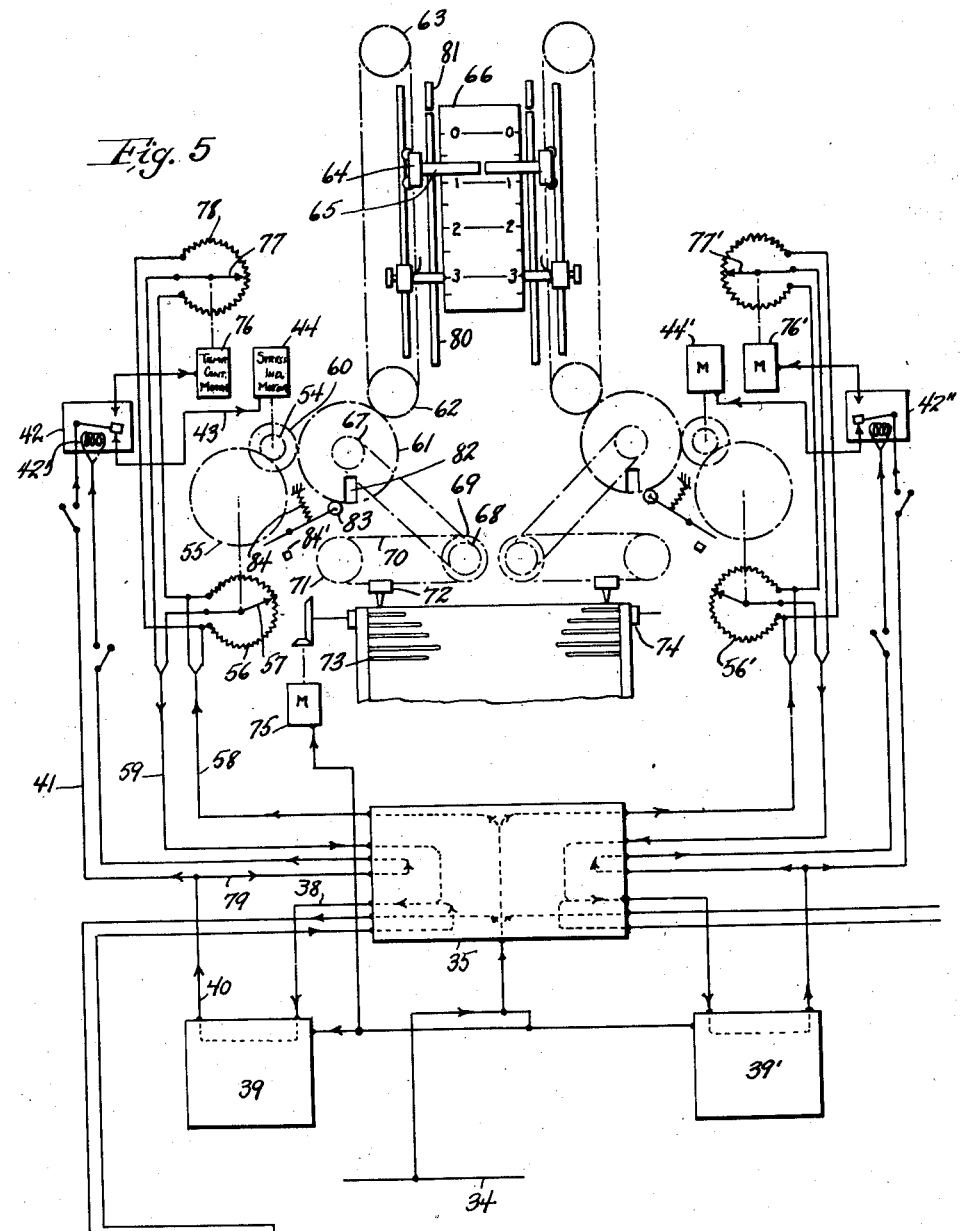

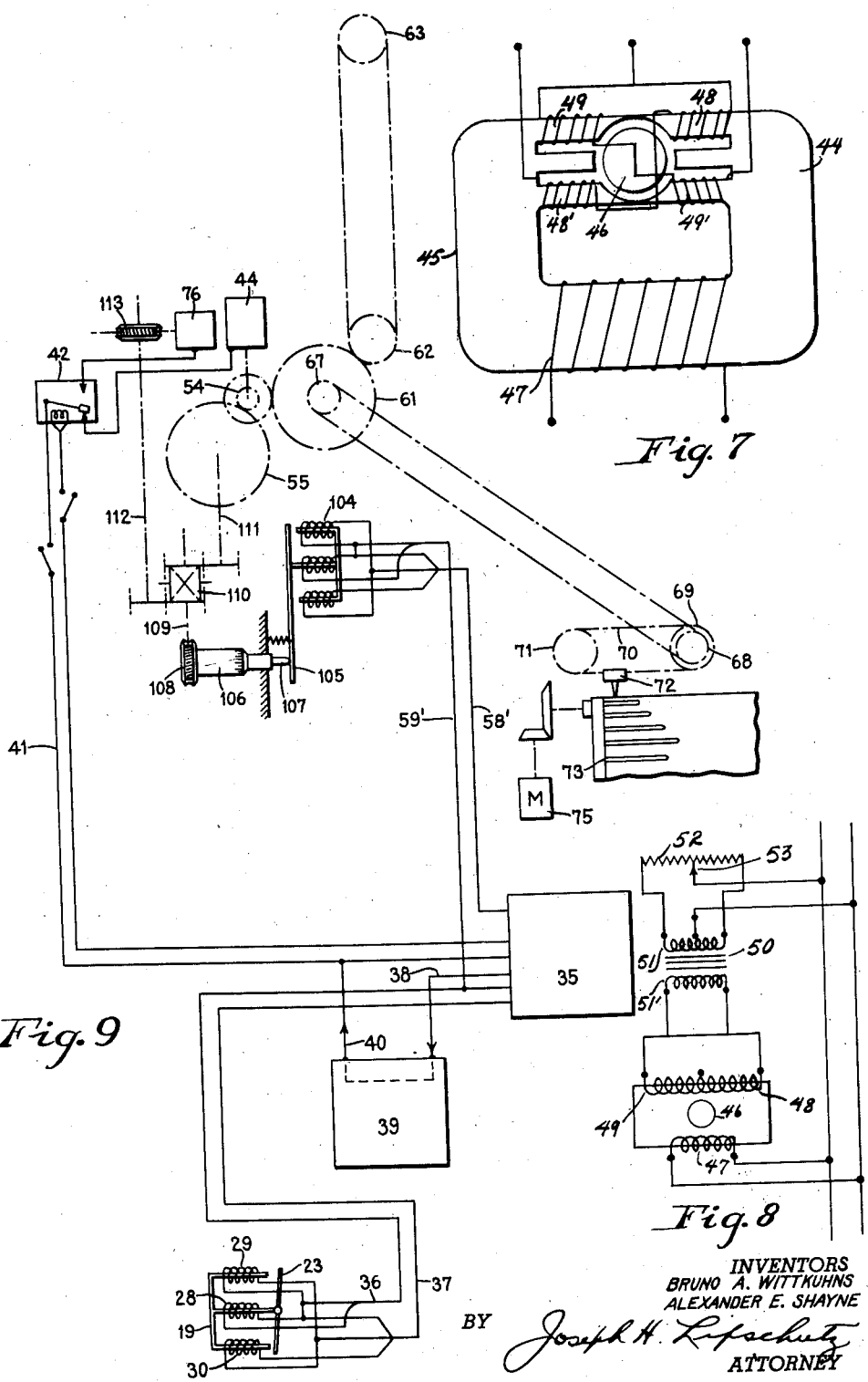

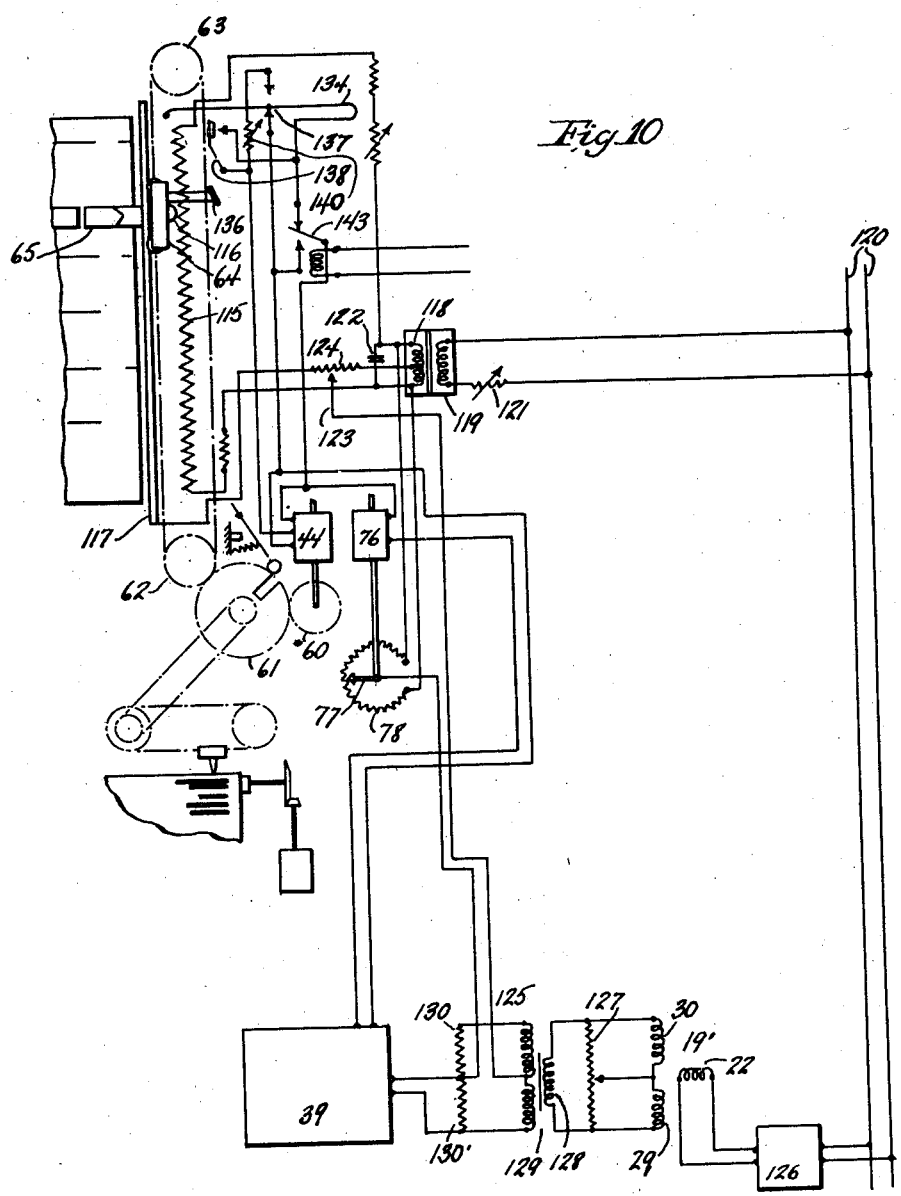

Patented June 29, 1943

2,323,267

UNITED STATES PATENT OFFICE 2,323,267

STRAIN GAUGE FOR ROLLING MILLS AND THE LIKE

Bruno A. Wittkuhns, Summit, N. J., and Alexander Shayne, New York, N. Y., assignors, by mesne assignments, to Sperry Products, Inc., a corporation of New York Application September 9, 1939, Serial No. 294,154

14 Claims. (Cl. 265—2)

This invention relates to instruments or devices for the measuring of very small distances or changes in position and more especially to devices used for the precise measurement of deflections of structural members used in machinery, ships, buildings, bridges or other structures, where they are subject to constant or variable loads.

It is a well-known fact that any structural member, if it is subjected even to the lightest load or change of load, will change its shape, be it ever so slight. This change is always proportional to the load applied to the member and, if it can be measured, the strain may be calibrated to indicate the load applied or stress.

Instruments to measure such deflections are well known and have been used extensively. The great majority of these instruments, however, are only usable for short time or for giving temporary indications because they require careful adjustment before measurements can be taken and these adjustments cannot be held constant over appreciable periods of time.

The present invention relates to an instrument of the above described nature, which will give continuous indications and which will keep its basis, or reference point from which the measurements are taken, constant by means of automatic readjustment, so that correct indications may be obtained continuously over long periods of time, regardless of temperature conditions, which in other instruments would cause a shift of the reference measuring point.

It is obvious that if very small changes of dimensions or position have to be measured, on the other of a fraction of a thousandth of an inch, it is imperative that the temperature of the measuring instrument, as well as of the measured object, be kept absolutely constant, as otherwise the expansion or contraction of the instruments or the object will cause grave errors in measurement. This is especially true if the measuring instrument, which might be a micrometer or a sensitive dial type indicator, is of small mass while the object on which measurements is taken is of large mass. The large mass will change its temperature at much slower rate than the small mass and, therefore, errors are unavoidable even if the measuring instrument and the object are of the same material.

The present invention overcomes this difficulty by providing an automatic readjustment of the basis or reference point from which measurements are taken. In its present form, described in this specification, the instrument has been adapted to the measurement of deflections occurring in the frames of rolling mill stands, which are subject to high pressures while rolling strip steel or other metals. The difficulty of overcoming errors due to temperatures is especially great in hot strip rolling mills in which the metal subject to the pressure between the rolls has a temperature ranging from 1400 to 1700 degrees Fahrenheit. The rolling mill, namely, the rolls and the frames, will alternately be heated by radiation and direct conduction and after the strip has passed through will cool again until the next sheet enters. Depending upon the frequency of hot strips entering the mill, its temperature, over long periods of time, will fluctuate widely and make any measurements of deflection, due to pressure in any of its members, impossible except for very short intervals of time.

The principle upon which the present invention is based is the fact that due to the tremendous mass of steel contained in the frames of a hot strip rolling mill, temperature changes in these members must be slow. The thermal capacity of these large masses of steel is of such dimensions that it takes hours to raise the average temperature of the rolling mill. Any change in the shape of rolls and the frames supporting the rolls, due to temperature change, therefore, must be very slow and gradual. However, a sudden change of the shape of the bearing frames occurs as soon as a sheet or strip enters between the rolls, which may exert a pressure of several million pounds upon the sheet while it is being rolled. As the sheet passes through the mill at speeds up to 1000 feet per minute, the time interval from zero pressure between the rolls to maximum rolling pressure is exceedingly short, so that the change of deflection of the bearing frame occurs almost instantaneously.

The present invention utilizes this fact to discriminate between the slow changes, due to temperature, creep or other causes, and the exceedingly fast changes experienced when a strip enters between the rolls. An electromagnetic gauge is used to detect even the slightest change in the shape of the bearing frames and is utilized to generate an electrical signal proportional to such changes. Temperature changes, therefore, will cause a signal with very flat wave front, low rate of change and small amplitude, while a sheet entering between the rolls will cause a high amplitude signal of very steep wave front and high rate of change. It is another object of this invention to provide means which automatically will operate one part of the instrument when temperature changes occur and another part of the instrument only when working pressures are suddenly appearing.

In the accompanying drawings,

Figure 1 is a side elevation of one of the two bearing frames of a rolling mill.

Figure 2 is a schematic diagram of a beam under load.

Figures 3 and 4 show our electromagnetic gauge on a larger scale and its actuating arm in front and end elevations.

Figure 5 is a schematic front elevation of a double strain gauge with all its working elements.

Figure 7 is a skeleton diagram of the reversible A. C. motor employed in the instrument.

Figure 8 is a wiring diagram showing the working principle for controlling the motor shown in Figure 7.

Figure 9 shows a form of strain gauge.

Figure 10 shows a further modification.

Figure 6:
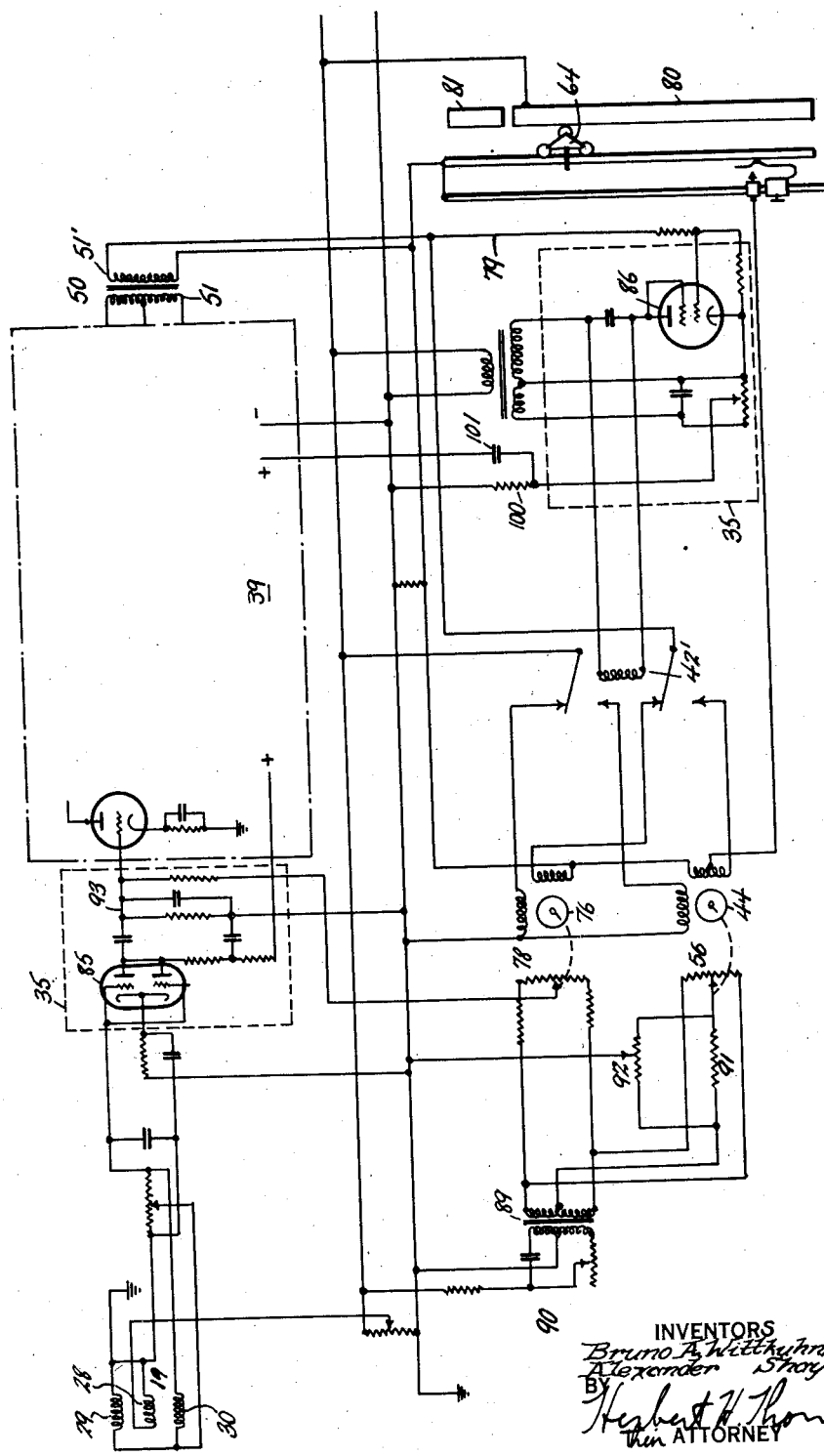
Figure 6 is a wiring diagram of one-half of Figure 5.

Referring now to Figure 1, there is shown one side frame 1 of a "four-high" rolling mill. Within this frame are located bearing blocks 2 and 3 in which the heavy back-up rollers 4 and 5 are journaled. Within the blocks 2 and 3 are smaller blocks 6 and 7 containing the bearings for the working rolls 8 and 9. These working rolls are driven in opposite directions by powerful motors not shown and between them the sheet to be rolled passes. The back-up rollers 4 and 5 have the purpose of preventing undue deflection or breakage of the working rolls and are, accordingly, made much heavier. A large screw 10 bears down on the top of the block 2 to exert pressure against the bearings of the back-up rollers which, in turn, force the work rolls together. The screw 10 therefore is the means by which varying pressures may be applied to the sheet while it is being rolled. This pressure causes the sheet to decrease in thickness and if it passes through a number of rolling mill stands consecutively, it will finally become a thin long ribbon the thickness of which is determined directly by the pressure applied while it passes through the mills. The pressure of the screw 10 is absorbed in the lower arch of the frame 1 which, therefore, changes its shape according to the pressure. As long as the pressure applied does not exceed the elastic limit of the frame 1, the deformations are elastic deformations and the lower arch of the frame 1 will return to its original shape as soon as the pressure is relieved.

Figure 2 shows the lower arch in greatly simplified form as a beam 11, which is put under stress by a load 12. If it is supported at the points 13 and 14 its elastic center line will deflect to conform to the curve 15. If now at the point 13 an arm 13—18, shown as a dot-dash line 16, is attached to the beam, then this arm will, when the beam is loaded, assume a position tangent to the curve 15 which is of generally parabolic shape. The initial deflection of the beam, therefore, which may be measured between the tip of the arrow 12 and the point 17, will, according to the mathematical laws of the parabola be amplified by this arm 16 four times, because the distance between the point 14 and the point 18 represents the actual motion of the point 18 during the deflection of the beam. As shown in Figures 2, 3 and 4, we employ such an arm 16 attached to the lower arch of the rolling mill stand 1 in order to cause the generation of an electrical potential in an electromagnetic gauge 19, which, in turn, is attached also to the same lower arch 1. The actual dimensions of the lower arch may be up to seventy inches and more between the points of support, but what is true for the whole length of the beam is generally true for any part thereof. Therefore, a comparatively short part of the beam may be selected to measure a small part of its deflection. As shown in Figure 1, the arm 16 and the electromagnetic gauge 19 are attached to the very lowest point of the arch and measure deflection only over a distance of from eight to sixteen inches more or less depending upon local conditions. The arm 16 in Figures 3 and 4 is welded to a block 20 which, in turn, is welded to the frame 1. The strain gauge 19, consisting of a U-shaped frame 21, a center leg 22 attached to the center of the member 21, and an armature 23 pivoted on a wire 24 clamped in a slot of the center leg 22, is attached to a bracket 26, which is attached to a block 27. This block is welded to the frame 1. Three coils are arranged on the three legs of the electromagnetic gauge in such a way as to form a differential transformer. Coil 28, surrounding the center leg, is shown as the exciting coil, and coils 29 and 30 are the secondary coils connected in series but electrically opposed to each other, so that in a balanced neutral condition their combined out-put is zero. The armature 23 maintains normally equal air gaps between itself and the two outer legs of the frame 21. In this condition, neutral balance is obtained. If the armature is even slightly deflected, one air gap will become smaller while the other one increases, thereby differentially changing the flux through the two secondary coils, causing an output voltage to appear across the two secondary coils of a magnitude proportional to the amount of tilt of the armature and of a phase depending upon the direction of tilt. A screw 31 is threaded into the arm 16 in such a way as to make contact between its tip and a hardened plate 32 on the armature 23. A spring 33 may be added to prevent the armature 23 and the screw 31 from losing contact. If the lower arch of the frame 1 is deflected by pressure of the screw 10, the arm 16 will assume its above described tangential position to the parabolic shape of the deflected elastic line of the arch and thereby cause the tip of screw 31 to move relative to the block 20 in a counter-clockwise direction, for a distance proportional to four times the actual deflection of the arch. The actual movement of the screw point on the arm 16 is further magnified mechanically by the suitable selection of the contact point between the screw and the armature, so that a further mechanical amplification may be readily obtained. The actual change of the air gap between the armature and the outer legs, therefore, may be many times the original deflection of the arch.

As explained before, this change of air gap manifests itself in an A. C. potential hereinafter called the "gauge signal" which now may be amplified in a suitable amplifier of known design, the out-put of which may be utilized to either position the pointer of an electrical measuring instrument or to drive a suitable motor in such direction as to move a pointer or recorder pen over a scale. The present instrument uses the last mentioned scheme, as shown in Figure 5. 19 is again the electromagnetic gauge with its three coils. The center coil receives its energy from the A. C. supply line 34, which passes through a distributing net-work in the box 35 and, as shown by arrows, flows from there through line 36 to the gauge 19. The out-put potential from the two secondary coils is returned to the same box 35 through lines 37, which in the schematic diagram for simplicity are only shown as single lines, while they actually contain two or more conductors. In box 35 the gauge signal is amplified in a one stage amplifier and from there it enters through line 38 into the main power amplifier 39 of conventional design. The out-put of this amplifier, through line 40 and 41 is conducted to a relay switch 42 from where it enters through line 43 into the dial drive motor 44.

Said motor is preferably of the reversible, shaded pole type and its schematic diagram is shown in detail in Figure 7. 45 is the laminated frame of the motor, 46 is its squirrel cage rotor, the exciting coil is at 47 and two sets of shading coils 48—48' and 49—49' are shown arranged around the armature. The two pairs of shading coils are connected in series as shown in Figure 8 and are connected to the low impedance secondary winding 51' of a transformer 50 which, in this case, is the out-put transformer of the amplifier 39. If the primary 51 of this transformer is supplied with reversible A. C., as shown schematically in Figure 8, in which a potentiometer 52 affords a simple means of reversing and varying the supply, it is possible to cause the motor to stand still with the slider 53 at the center of the potentiometer and to rotate at a speed which increases as the slider is moved away from the center. The direction of rotation of the motor is governed by the direction in which the slider 53 is moved. Due to the fact that the secondary winding 51' of the transformer 50 is connected across the two shading coils and is of low impedance, powerful, dynamic braking is available as soon as the voltage in coil 51' changes toward zero. This has the advantage that in ordinary application, this motor will not overrun if the voltage in coil 51' is suddenly decreased to zero. The tendency of the armature to keep on rotating is checked also by the fact that its rotation induces a voltage in the shading coils which is exactly opposite to the voltage which caused its rotation, thereby providing a retarding torque for the armature which is the stronger the faster the rotor is coasting.

In the actual instrument, the potentiometer 52 is replaced by the amplifier 39, Figure 6, which performs the same action in effect. The gauge signal entering into the amplifier therefore causes the motor to run in a given direction as long as the gauge signal persists. In order to measure the amount of gauge signal and, thereby, the amount of the deflection of the arch or the amount of pressure applied through screw 10, it is necessary to stop the motor at a point where its total revolutions are proportional to the amplitude of the gauge signal. We therefore, through gears 54 and 55 connect a potentiometer 56 (Fig. 5) in such a way to the motor 44 that its sliding arm 57 is turned by the motor. A constant voltage in phase with the gauge signal, and hereinafter called the balancing voltage, is supplied to the two ends of the potentiometer through line 58 from the A. C. supply, so that the slider 57 will move along points of varying potential as it slides over the potentiometer wire. This varying potential, through line 59, is fed back to the box 35 and is there mixed with the gauge signal in such a way that it opposes the gauge signal. It is obvious, therefore, that while the motor is rotating, it will cause an ever increasing potential to oppose the gauge out-put potential until both potentials are equal, at which time the in-put to the amplifier 39 becomes zero, causing the motor 44 to stop. The voltage obtained from the potentiometer and the total revolutions of the motor 44 now must be proportional to the amplitude of the gauge signal.

Through gears 60 and 61 we connect two chain pulleys 62 and 63 to the motor 44, so that an endless chain running over these pulleys will move in synchronism with the motor. Connected to said chain is a carriage 64 rolling between two metal rods by means of small wheels or pulleys. Fastened to this carriage is a pointer 65 sliding over a scale 66 which may be graduated in any suitable way to indicate either deflections or pressures. We prefer to graduate this scale in millions of pounds. At the time when the motor stops, and when the gauge signal is accurately balanced by the opposing signal from the potentiometer 56, the pointer 65 has reached a position at which it accurately indicates the pressure exerted by the reaction of the bar passing between the rolls.

In order to be able to calibrate the scale to the actual pressures, it is necessary to apply known pressures by means of the screw 10 and then to adjust the balancing voltage coming from potentiometer 56 by means of an adjustable resistance net work until the position of the pointer coincides with the actually applied pressure. This net work is also contained in box 35.

On the same shaft with gear 61 is mounted also a chain pulley 67 driving another chain pulley 68. On the same shaft with the pulley 68 is fastened another pulley of the same type 69 which, by means of a chain 70, is connected to pulley 71. To the chain 70 is fastened a recording pen 72 sliding over a strip of paper 73, which is rotated by a roller 74 driven from a constant speed motor 75. The motions of the pen 72 are proportional to the motions of the pointer 65 so that, if the paper strip 73 is moved at constant speed, the pen 72 will permanently record the motions of the pointer 65 and thereby the pressures exerted by the reaction of the bar passing between the rolls.

The instrument as described so far would perform satisfactorily only if all working parts on the mill and in the instrument would be insensitive to temperature changes. As explained above, it is necessary to provide compensation for changes due to temperature and we, therefore, have provided a temperature compensation motor 76 driving the slider 77 of a potentiometer 78. Said potentiometer may be connected in parallel to the potentiometer 56 and performs a similar function. Normally, as shown in the position of the switch 42, the motor 76 is disconnected from the amplifier supply, as long as a gauge signal is present. If, however, no gauge signal is present and the pointer 65 returns to its zero position, then the switch 42 disconnects the motor 44 and connects the motor 76, so that from now on any signal appearing at the amplifier will be conducted in amplified form to the motor 76 which now, by turning the slider 77, will balance out such small signals as may be caused by slow temperature changes. The operation of the relay switch 42 is controlled by a coil 42', which is energized through a vacuum tube 86 situated in the box 35 and shown in detail in the wiring diagram, Figure 6. The grid circuit of this vacuum tube, by means of line 79, Figure 5 receives the out-put voltage of the amplifier 39 and actuates the relay 42 only if a certain threshold value of out-put signal is surpassed. If, therefore, a sudden high amplitude signal is received as, for instance, when a sheet enters between the rolls of the mill stand, the tube will instantaneously operate the relay 42, thereby disconnecting the compensator motor 76 and connecting the dial drive motor 44 to the amplifier. Now the out-put of the amplifier will cause the dial drive motor 44 to move the pointer as described before. At the time the pointer comes to rest, the out-put signal of the amplifier 39 becomes zero, which would cause the above described vacuum tube to de-energize the relay 42. This is undesirable at this time because the dial drive motor must remain connected to the amplifier until the dial pointer has returned to zero. We therefore provide an electrical connection between the carriage 64 and the rail 80 so that as soon as the carriage has passed over the gap between rails 80 and 81, the relay tube is permanently biased to maintain the relay in its correct position. This permanent bias automatically is disconnected as soon as the carriage 64 returns to its zero position. The electrical connections serving this purpose are shown in the wiring diagram, Figure 6.

The gear 61 carries parallel to its face, a disk having a square cut out 82, which may be engaged by a lever-supported roller 83. Said roller enters into the slot 82 just before the carriage reaches its zero position, and a spring 84 tends to pull the pointer towards the zero point. The lever is limited in its motion by an adjustable stop 84' so that the pointer 65 can never travel beyond its zero position, while the spring 84 holds the pointer there with a small amount of pressure, insufficient to prevent free travel of the pointer in case of a strong gauge signal.

The right-hand portion of Fig. 5 is a duplicate of the left and works in the same manner, and the primed reference numerals used in the right-hand portion refer to parts identical with those designated by unprimed numerals.

The wiring diagram, Figure 6, shows in detail the electrical connections for the system described in Figure 5. Only one half of the electrical system is shown in Figure 6 as the other half is identical in design and performance. 85 designates the first stage preamplifier tube contained in box 35 of Figure 5. The box 35 is shown in two parts in Fig. 6 merely for convenience. The amplifier 39 may be a conventional three stage power amplifier and its details, therefore are omitted. 86 is the relay actuating vacuum tube, described above and contained in box 35. The dial motor 44 and the compensator motor 76 are shown in their correct electrical relation to the relay switch 42 and the out-put of the amplifier 39. The balancing voltage, as applied to the two potentiometers 56 and 78, is taken from a transformer 89, the primary of which is fed from a phase shifting net work 90 of known design, serving the purpose of obtaining phase alignment with the gauge signal. The calibrating net work consists of the resistor 91 and the potentiometer 92, by which it is possible to graduate the amount of balancing voltage to be applied to the mixing net work 93, at which point it opposes the amplified gauge signal as it emerges from the tube 85. Also shown in this wiring diagram are the two rails 80 and 81 and the electrical connections between the carriage, the rails and the grid circuit of the tube 86. This tube is permanently biased as soon as the carriage 64 touches rail 80.

The wiring diagram, furthermore, shows a time delay circuit, consisting of a resistor 100 and a condenser 101 connected in such a way into the grid circuit of the relay tube 86 that a strong negative bias is applied to this tube at the time the whole instrument is first energized. The amplifier 39 has a conventional rectifier tube for supplying D. C. to the plates of the amplifier tubes and the condenser 101 is connected to the positive side of the rectifier tube to charge the condenser 101 and causes a considerable voltage drop across the resistor 100, thereby preventing tube 86 from becoming active even though a strong signal may be present. Such a signal may be caused by the fact that during the last active operation of the instrument, temperature changes had been balanced out by the compensator which normally would have driven the pointer into the negative. After the instrument has cooled off and is then started again, a strong positive signal would be present and might be of sufficient amplitude to energize the tube 86, thereby causing the dial pointer 64 to leave its zero position. This would be undesirable because it is intended to function only when a strong signal is received from the rolling mill at the time a sheet passes through. The just described time delay circuit, therefore, effectively prevents erroneous accidental operation of the pointers. After about thirty seconds, during which time the temperature compensator motor has had sufficient opportunity to balance out the signal caused by the temperature difference between the condition when the instrument was shut down and the condition when it is started up again, the condenser 101 is fully charged and the negative bias on tube 86 disappears, so that from now on normal operation is possible.

Figure 9 shows a modification of the system as described with Figure 5 and Figure 6. Only its essential details are shown, which comprise the temperature compensator motor 76, the dial drive motor 44, the relay switch 42 and the gear train to the chain drive pulleys 62 and 63. In this modification, the balancing voltage employed to oppose the gauge voltage is derived from a second electromagnetic gauge 104, similar to the gauge shown and described with Figures 3 and 4 except that it has a long armature 105 controlled in its position by a micrometer head 106. The rotational position of this micrometer head which controls the amount to which the pin 107 projects from the head, is governed by a worm gear drive 108, connected to the third arm 109 of a differential 110. The first arm 111 of this differential is driven by means of gears 54 and 55 from the dial drive motor 44, and if the second arm 112 of the differential is held stationary, it will rotate the micrometer head 106 until the armature 105 has assumed a position proportional to the position of the electromagnetic gauge mounted on the mill. The gauge signal coming from the mill is opposed by the signal from the balancing gauge 104 in a similar way as described before. Lines 58' and 59' correspond to lines 58 and 59 of Fig. 5. If no mill gauge signal is present, the relay switch 42 will automatically disconnect the dial drive motor from the differential and instead connect the compensator motor 76 to the arm 112.

In order to make this drive self-locking, a worm gear drive 113 is employed. Signals caused by temperature changes and having a slow rate of change will operate the motor 76 and thereby cause the micrometer 104 to balance out such signals. If a signal of high enough rate of change and sufficient amplitude to operate the relay tube 86—Figure 6—appears, the compensator motor 76 is automatically disconnected by means of switch 42 and the dial drive motor now operates the pointer and the micrometer 104 simultaneously, as described before. The advantage of this arrangement is that both the gauge signal and the balancing voltage are generated by identical means, namely, differential transformers of equal design and characteristics. Therefore, any change of voltage or frequency in the supply line would affect both opposing voltages equally, thereby eliminating the undesirable effect which a one sided change might otherwise have on the position of the dial pointer.

Figure 11:
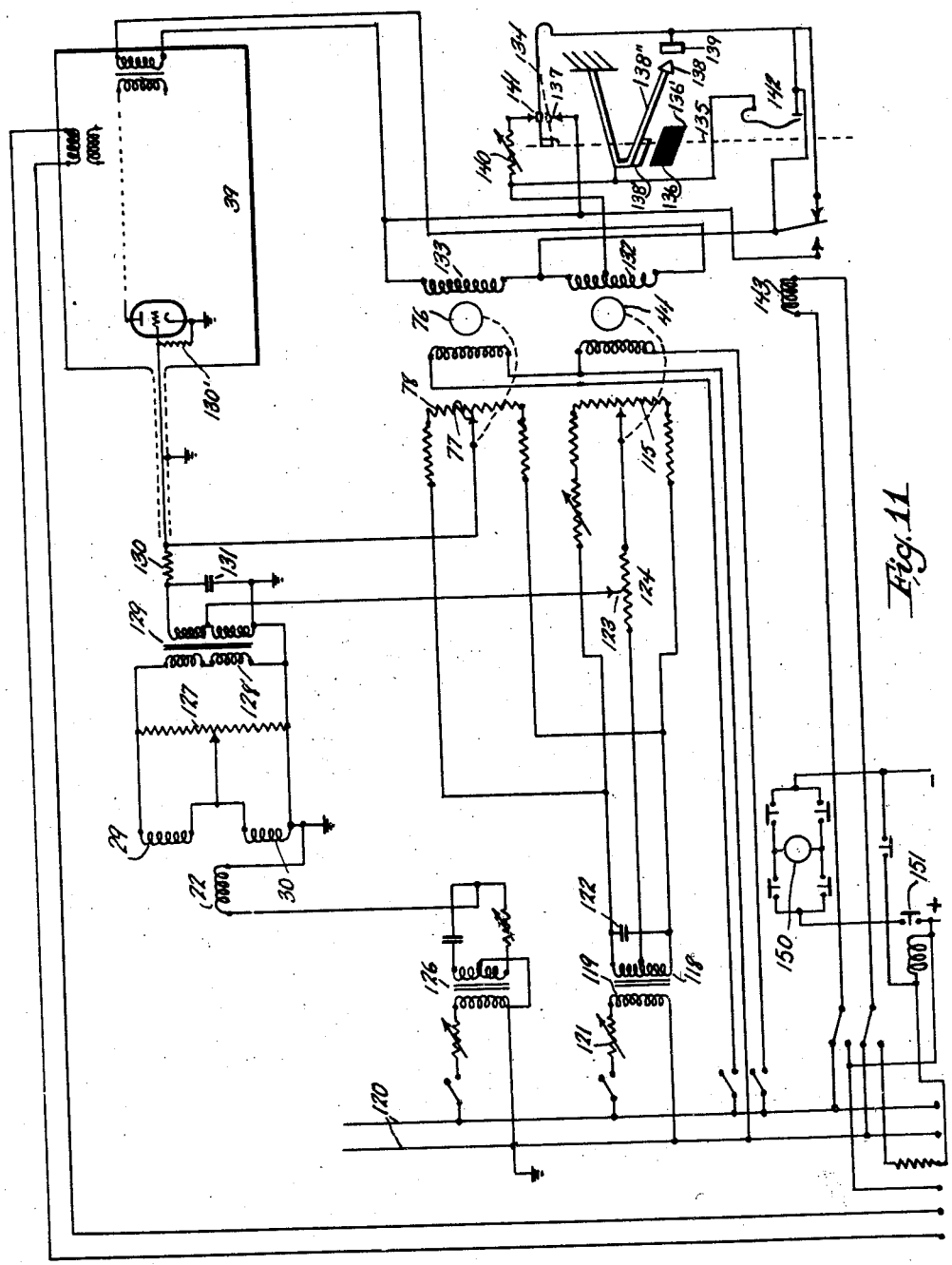
Figure 11 shows a schematic wiring diagram of a part of Figure 10.

A further modification of Figure 5 is shown in Figures 10 and 11. Mechanically, there is not much difference from the schematic as shown in Figure 5. The dial drive motor 44, through gears 60 and 61, drives the chain pulleys 62 and 63 by means of which the carriage 64, carrying the pointer 65 is operated. Instead of driving a rotary potentiometer to create sufficient potential of the balancing voltage, a straight potentiometer 115 is employed along which one trolley 116 of the carriage 64 rolls, making electrical contact between the potentiometer wire and the rail 117. The potentiometer 115 through several fixed and adjustable resistors, is connected across the secondary winding 118 of an insulating transformer 119, which is energized from the supply line 120 through an adjustable rheostat 121. A condenser 122 is connected across the secondary coil 118 and serves the purpose of smoothing out the wave form of the secondary voltage, at the same time, in connection with rheostat 121, providing a simple means of phase adjustment. The compensator motor 76, as before, is directly connected to the movable arm 77 of a rotary potentiometer 78 and its functions are identical with those described for Figure 5. It is energized from the same secondary winding 118 of the transformer 119 and takes over the functions of the dial drive motor automatically when no mill gauge signal is present. The balancing voltage itself is taken to the mixing unit from the slider 123 of a range adjusting potentiometer 124 and from the slider 77 of the compensating potentiometer 78. From these two points it is connected to two points of equal potential on a mixing bridge 125, which is so arranged that the signal from the electromagnetic gauge and from the balancing voltage will add or subtract without causing interaction in their respective circuits.

The gauge exciting voltage, which has been adjusted as to amplitude and phase in the gauge signal phase adjustment unit 126, energizes the primary coil 22 of the electromagnetic gauge 19' and causes equal and opposing voltages to appear in the secondary coils 29 and 30. The gauge is here shown only schematically, leaving out the mechanical parts and illustrating only the electrical coils and connections. After balancing the two coils against each other to obtain perfect zero at neutral gauge position, by means of the balancing potentiometer 127, the gauge signal enters the primary coil 128 of the mixing transformer 129, the secondary of which has two equal windings in series. These two windings, together with two resistors 130 and 130', form the mixing bridge 125. It is obvious that across the resistor 130' there will appear one-half of the gauge signal and one-half of the balancing potential and if phase relations and signs of the potentials are correct, the two will balance each other at a time at which the dial pointer comes to rest. Evidently, if the slider 123 of the range adjusting potentiometer 124 is moved to the left, a smaller and smaller portion of the balancing voltage is applied to the mixing network, so that the gauge signal may drive the dial drive motor and thereby the pointer further and further along the scale. It is, thereby, possible to calibrate the readings of the instrument dial with great accuracy, provided means are available to subject the mill housing to a known pressure.

The gauge and balancing voltages, after being mixed in the network 125, enter into the power amplifier 39 and are amplified until sufficient energy is accumulated to allow operation of the motors. In Figure 11, the mixing network is shown slightly different from Figure 10, but the essential units are the same. The only difference is that resistor 130' is contained within the power amplifier 39 where one end of same is grounded. The condenser 131 serves the purpose of improving the wave form of the signal.

The dial drive motor 44 has its control winding 132, Figure 11, connected directly in series with the control winding 133 of the compensator motor. The field windings of both these motors are energized in parallel from the A. C. supply line 120. If both motors are at their neutral position and if a signal is transmitted from the amplifier 39 through the two motor control windings 132 and 133, both motors would start to rotate simultaneously. If the signal is caused by a bar entering the rolling mill, it will have a high rate of change and large amplitude and should operate the dial motor only. In order to prevent the compensator motor from also responding to this signal, a mechanical switch 134 has been provided (see also Figure 10) by means of which the movement of the dial motor will automatically short out the control winding of the compensator motor after a very short time interval. The dotted line 135 represents the path which the slider 64 of Figure 10 takes as it is driven by the dial drive motor. A small piece of insulating material 136 is fastened to the slider 64 in such a position that it will engage the spring switch 134 and keep it from touching contact 137 as long as the pointer is at zero. As soon as the pointer moves away from zero towards higher readings, the spring 134 will be released and will touch contact 137 thereby shorting the winding 133 of the compensator motor, which now under the influence of powerful dynamic braking, will immediately come to rest. In actual practice, the armature of this motor hardly makes one-half of one revolution and as it drives its potentiometer through a large reduction gear, the slider 77 remains practically stationary. The dial motor 44 receives at the same time the whole signal at its full strength and normal operation of the instrument is assured. As soon as the gauge signal disappears, the motor reverses due to the prevailing of the balancing voltage and travels back to zero, until the insulating piece 136 engages an arm 138' carried by spring switch 138'', said arm extending at right angles to the plane of the paper (in Fig. 11) to move the one way switch to the right, a short distance from its zero position and cause contact 138 to engage 139. This will short through contact 139 one-half of the control winding of the dial motor 44. The result of this momentary shorting is a powerful impulse on the motor toward zero, which is desirable in order to prevent the motor from coming to rest before actual zero position is reached. The motor, therefore, travels toward zero with enough force to lift up spring 134, thereby releasing the blocked compensator motor and then through contact 141 applying a partial short circuit across the same half of the dial drive motor, through an adjustable rheostat 140. As the slider reaches this position, the contact 138 snaps back into its original position. As soon as another gauge signal arrives, the slider 64 starts again but the shorting switch contacts 138, 139 cannot close now, because the wedge shaped point 136' of insulating block 136 engages the extreme right edge of arm 138' to cause switch 138" and its contact 138 to move away from contact 139. The switch contacts 138—139, therefore, are only operative when the pointer travels towards zero but not when the pointer travels to higher readings, leaving the dial drive motor free to follow even the lightest and smallest impulses once it has overcome the retarding force of its partially shorted winding. This partial short is immediately broken as soon as the dial motor starts, because spring 134 will automatically interrupt this circuit if the dial motor moves even very slightly.

It is evident that by connecting the two motor windings in series and providing an automatic mechanical throw-over switch, it is possible for this arrangement to discriminate between small signals with low rate of change and large signals with high rate of change. As long as the amplitude of the gauge signal and its rate of change is large enough to overcome the retarding effect of the partial shorting of one-half of the control winding of the dial drive motor, this motor will start and thereby not only free itself from its electric brake, but also paralyze the compensator motor at the same time, so that gauge signals will only cause response of the dial drive motor, while slow and small signals caused by temperature changes will only cause response of and be compensated for by the compensator motor.

Figure 11 further shows a limit switch 142, which preferably works essentially in the same manner as the one way switch 138—139. If the pointer, by an extremely large signal, is driven all the way down the scale where it finally would strike a stop, it closes switch 142 just before it reaches such stop. In the position of the switch shown in Fig. 11 the relay 143 is always energized, but this is for testing purposes only. In operation, the switch is thrown to engage the lower set of contacts where the circuit is controlled by switch 151. Switch 142 is connected in parallel with switch 138 and shorts one-half of the control winding of the dial drive motor 144, giving the motor a powerful impulse to rotate in a direction towards zero. Together with the mechanical friction of this limit switch, the counteracting force of the shorted winding is large enough to stop the dial drive motor or even to reverse it, in which case the pointer will dance back and forth until the too large signal has subsided. In this way, mechanical damage to the pointer or other sensitive parts is prevented.

We also provide an automatic levelling relay 143. This electromagnetic relay may constitute a single pole double throw switch. Normally, it is in such a position as to keep the shorting circuit for the dial drive motor in operative condition. If the relay is energized, it interrupts the shorting circuit and shorts out the compensator motor so that now there is no restraining force at all on the dial drive motor, even when it is at its zero position closing the contacts for the partial short circuit through resistance 140. This relay is used when the instrument is employed for the levelling of a mill. At that time the mill is put under pressure by means of the screw-down motor 150 and, due to the relatively slow rotation of the screws, the pressure mounts slowly. Without the levelling relay 143, the compensator motor would respond to this slow pressure signal and continuously neutralize same so that the dial pointer would remain at zero. If, however, the relay 143 is energized by connecting the same to the first master circuit breaker 151 of the screw down motor, then every time the screw down motors are operated, the dial drive motor becomes free and the compensator motor blocked, and the dial motor will follow any change of pressure in the mill caused by the operation of the screw down motor. As soon as the screw down motor is stopped, the relay snaps back to its normal position.

This feature is of special importance if, during production, the mill goes from a normal non-preloaded condition to a preloaded condition, due to a desired change of gauge thickness of the material passing through the mill. In such a case, the mill operator will adjust the screw down position on the mill until he reaches a condition which, according to his experience, tells him that correct gauge thickness will be produced. This may mean that even when there is no bar passing through the mill, the rolls are in permanent contact with considerable pressure applied by means of the screw-down. When operating under such conditions, the pointers will never reach zero but will indicate the preload while the mill is idle and will show full pressure when a bar is passing through. It is evident, therefore, that by means of the automatic levelling relay, we have succeeded in making the instrument independent from manual control to perform correctly under any practical condition which may arise in the normal production.

While we have described the function and the construction of our novel magnetic micrometer and strain gauge indicator as it is applied to a rolling mill, it obviously has other applications. In fact, it may be applied to any structure periodically put under strain in which it is desirable to know the amount of load under which the structure is working. It is, therefore, possible to employ our instrument to great advantage in the operation of power presses, shears, hydraulic apparatus, bridges and any other device where exact measurement of deflections is important.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a device for measuring elastic deformations of a member under stress, an electromagnetic gauge adapted to be attached to said member and responsive to change of shape of said member, said gauge having means thereon for producing electric A. C. potentials proportional to said changes, a reversible A. C. power motor controlled by said potentials, means driven by said motor for producing an A. C. potential proportional to its total revolutions and opposing said first potential, means for obtaining phase alignment of said first and said second potentials, means for adding said two potentials in phase opposition to cause said motor to stop when both said potentials are of equal amplitude, and means for indicating the total revolutions of said motor.

2. In a device for measuring elastic deformations of a member under stress, an electromagnetic gauge adapted to be attached to said member and responsive to changes of shape of said member, said gauge having means thereon for producing electric A. C. potentials proportional to said changes, a reversible A. C. power motor controlled by said potentials, automatic means for causing said motor to respond only to potentials of high amplitude and high rate of change, means driven by said motor for producing an A. C. potential proportional to its total revolutions and opposing said first potential, means for obtaining phase alignment of said first and said second potentials, means for adding said two potentials in phase opposition to cause said motor to stop when both said potentials are of equal amplitude, and means for indicating the total revolutions of said motor.

3. In a device for measuring elastic deformations of a member under stress, an electromagnetic gauge adapted to be attached to said member and responsive to changes of shape of said member, said gauge having means thereon for producing electric A. C. potentials proportional to said changes, a reversible A. C. power motor controlled by said potentials, means driven by said motor for producing an A. C. potential proportional to its total revolutions and opposing said first potential, means for obtaining phase alignment of said first and said second potentials, means for adding said two potentials in phase opposition to cause said motor to stop when both said potentials are of equal amplitude, means for indicating the total revolutions of said motor, a second reversible A. C. power motor also responsive to said potentials and driving another means for producing A. C. potentials proportional to its total revolutions, and automatic switching means for causing said first named motor to respond only to high amplitude potentials of high rate of change while said second motor remains stationary, and for causing said last named motor to respond only to low amplitude potentials of low rate of change while said first named motor remains stationary.

4. In an indicating instrument for indicating differential deflections of a member under load, differential gauge means responsive to said load and creating a potential proportional thereto, a pair of reversible power motors responsive to said potential, means for causing one of said motors to respond only to high amplitude potentials of rapid rate of change and for causing the other one of said motors to respond only to low amplitude potentials of slow rate of change, a thermionic tube controlled by said potentials to operate said means, means for adjusting the threshold value of said tube, and time delay means in the grid circuit of said tube for preventing said tube from operating for a given period after starting said instrument.

5. In an automatic bearing load indicator and recorder for rolling mills, electromagnetic gauge means responsive to said load and adapted to generate an alternating current potential proportional thereto, a reversible electric power motor responsive to said potential, an indicator, a recorder, means whereby said motor operates said indicator and said recorder, a potential producing means driven by said motor whereby said last named potential becomes proportional to the total revolutions of said motor, non-reacting mixing means for opposing said first potential to said second potential, separate phase shifting means for producing substantially complete phase opposition of both of said potentials so that said motor stops when both potentials are equal and opposite, and automatic means for keeping the output of said mixing means at zero during idle periods of said rolling mill regardless of changes of temperature of said mill or said gauge.

6. In an instrument for measuring, indicating and recording the bearing loads of a rolling mill, an electromagnetic gauge responsive to said load and adapted to generate an electrical potential proportional thereto, a pair of reversible power motors each having a control winding responsive to said potential, said control windings being connected in series, an indicating pointer and a recording pen driven by the first of said motors, means including a circuit for effecting dynamic braking of said first motor to maintain it stationary at zero pointer position under no-load condition of the mill, whereby the second of said motors alone responds to slow changes of said potential due to temperature changes, means driven by said first motor for rendering inoperative said second motor as soon as said potential surpasses a predetermined value of amplitude and rate of change sufficient to start said first motor, and means for simultaneously disconnecting said dynamic braking circuit.

7. In an instrument to determine the elastic deformation of a member under stress, means attached to said member responsive to slow and rapid changes of shape of said member, means controlled by said means for generating an electrical potential proportional to said changes, amplifying means for amplifying said potential, reversible motor means driven by the output from said amplifier, means whereby said reversible means is adapted to be responsive only to potentials generated by said rapid changes in excess of a predetermined rate of change and means for nullifying potentials generated in response to rates of change of strain less than said predetermined rate of change.

8. In an instrument to determine the elastic deformation of a member under stress, means attached to said member responsive to slow and rapid changes of shape of said member, means controlled by said means for generating an electrical potential proportional to said changes, amplifying means for amplifying said potential, reversible motor means driven by the output from said amplifier, means whereby said reversible means is adapted to be responsive only to potentials generated by said rapid changes in excess of a predetermined rate of change, means for nullifying potentials generated in response to rates of change of strain less than said predetermined rate of change, means driven by said motor for producing a balancing potential proportional to the number and direction of the revolutions of said motor, means whereby the potential generated by said rapid changes in excess of a predetermined rate of change is opposed by said balancing potential whereby said motor is brought to rest, and strain indicating means driven by said motor.

9. In a strain indicator for rolling mills having a screw-down motor, means for rendering said motor effective, a power driven indicator for indicating the amount of strain, a temperature compensator for keeping constant the starting point from which said indicator travels, means for normally maintaining said temperature compensator effective, and means for rendering said temperature compensator ineffective when said motor is operating.

10. In a strain indicator for rolling mills having a screw-down motor, means for rendering said motor effective, an indicator for indicating the amount of strain, a temperature compensator for keeping constant the starting point from which said indicator travels, means for normally maintaining said temperature compensator effective, means for rendering said temperature compensator ineffective when said motor is operating, and means actuated by the indicator for rendering said temperature compensator ineffective.

11. In a strain gauge, means adapted to be secured to the bar under test to be deflected by elastic changes therein, a pivoted armature moved by the deflection of said means, differential transformer coils adjacent said armature, the output of which varies in magnitude and direction with movements of said armature, an indicator, reversible motive means actuated by said output for actuating said indicator, and means also actuated from said motive means for creating a potential opposing the output of said transformer which is proportional to the amount of rotation of said motive means, said opposing potential means including a second differential transformer moved by said motive means.

12. In an instrument to determine the elastic deformation of a member under stress, means attached to said member and responsive to changes of shape of said member, means controlled by said means for generating an electrical potential proportional to changes of strain, means adapted to be rendered effective only by potentials generated by a rate of change of strain in excess of a predetermined rate of change, a reversible motor, means whereby said motor is driven in response to said last-named potentials, means driven by said motor for producing a balancing potential in opposition to said last-named potentials and proportional to the number and direction of the revolutions of said motor whereby said motor is brought to rest, and strain indicating means driven by said motor.

13. In an instrument to determine elastic deformation of a member under stress, means attached to said member and responsive to strain in said member, means controlled by said means for generating an electric potential proportional to changes of strain, means normally effective when the rate of change of strain is less than a predetermined rate for generating a balancing potential equal in amount to the potential generated by said strain gauge, means for opposing said potentials, and means whereby said normally effective means is rendered ineffective when the rate of change of strain is greater than said predetermined rate.

14. In an instrument to determine elastic deformation of a member under stress, means attached to said member and responsive to strain in said member, means controlled by said means for generating an electric potential proportional to changes of strain, means normally effective when the rate of change of strain is less than a predetermined rate for generating a balancing potential equal in amount to the potential generated by said strain gauge, means for opposing said potentials, means whereby said normally effective means is rendered ineffective when the rate of change of strain is greater than said predetermined rate, actuating means adapted to be rendered effective only by potentials generated by a rate of change of strain in excess of said predetermined rate, indicating means, and means whereby said indicating means is actuated by said actuating means.

BRUNO A. WITTKUHNS.
ALEXANDER SHAYNE.